US010439248B2

(12) United States Patent
Rahn et al.

(10) Patent No.: US 10,439,248 B2
(45) Date of Patent: Oct. 8, 2019

(54) SANDWICH PANELS WITH BATTERY CORES

(71) Applicant: The Penn State Research Foundation, University Park, PA (US)

(72) Inventors: Christopher D. Rahn, State College, PA (US); Charles E. Bakis, State College, PA (US); Michael Hickner, State College, PA (US); Yancheng Zhang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 301 days.

(21) Appl. No.: 15/111,602

(22) PCT Filed: Nov. 26, 2014

(86) PCT No.: PCT/US2014/067700
§ 371 (c)(1),
(2) Date: Jul. 14, 2016

(87) PCT Pub. No.: WO2015/112257
PCT Pub. Date: Jul. 30, 2015

(65) Prior Publication Data
US 2016/0351939 A1 Dec. 1, 2016

Related U.S. Application Data

(60) Provisional application No. 61/931,877, filed on Jan. 27, 2014.

(51) Int. Cl.
| | | |
|---|---|---|
| *H01M 10/04* | (2006.01) | |
| *H01M 2/18* | (2006.01) | |
| *H01M 2/08* | (2006.01) | |
| *H01M 2/16* | (2006.01) | |
| *H01M 2/36* | (2006.01) | |
| *H01M 10/058* | (2010.01) | |
| *H01M 6/42* | (2006.01) | |
| *H01M 10/0585* | (2010.01) | |

(52) U.S. Cl.
CPC ......... *H01M 10/0413* (2013.01); *H01M 2/08* (2013.01); *H01M 2/1653* (2013.01); *H01M 2/1686* (2013.01); *H01M 2/18* (2013.01); *H01M 2/36* (2013.01); *H01M 2/365* (2013.01); *H01M 6/42* (2013.01); *H01M 10/04* (2013.01); *H01M 10/0431* (2013.01); *H01M 10/0436* (2013.01); *H01M 10/058* (2013.01); *H01M 10/0585* (2013.01); *H01M 2220/20* (2013.01)

(58) Field of Classification Search
CPC ......... H01M 10/0463; H01M 10/0459; H01M 10/045; H01M 10/0436; H01M 10/0431; H01M 6/48; H01M 6/46; H01M 2/365; H01M 2/36; H01M 2/1686; H01M 10/123; H01M 10/125; H01M 10/126; H01M 10/3981; H01M 2/18
USPC ......................................................... 429/144
See application file for complete search history.

(56) References Cited

U.S. PATENT DOCUMENTS

| | | | |
|---|---|---|---|
| 2,933,547 A | 4/1960 | Grubb, Jr. | |
| 3,472,696 A | 10/1969 | Shoeld | |
| 3,874,934 A | 4/1975 | Zangrando | |
| 3,904,433 A | 9/1975 | Frazier | |
| 4,051,304 A | 9/1977 | Snook | |
| 4,964,877 A * | 10/1990 | Keister | A61N 1/378 29/623.1 |
| 5,603,737 A | 2/1997 | Marincic et al. | |
| 5,631,102 A | 5/1997 | Spillman et al. | |
| 5,922,490 A | 7/1999 | Kump | |
| 6,040,085 A | 3/2000 | Cheu et al. | |
| 6,951,576 B1 * | 10/2005 | Takeuchi | H01M 4/382 29/623.1 |
| 2003/0072995 A1 | 4/2003 | Nark et al. | |
| 2004/0081889 A1 * | 4/2004 | Lee | H01M 4/134 429/233 |
| 2010/0028767 A1 * | 2/2010 | Inose | H01M 4/139 429/128 |
| 2011/0025048 A1 | 2/2011 | Webster et al. | |
| 2011/0210954 A1 | 9/2011 | Murphy et al. | |
| 2011/0287323 A1 | 11/2011 | Chen | |
| 2012/0148913 A1 * | 6/2012 | Chiba | H01M 2/024 429/179 |
| 2012/0295158 A1 * | 11/2012 | Tanaka | H01M 2/1673 429/211 |
| 2014/0079979 A1 * | 3/2014 | Kwon | H01M 2/08 429/127 |
| 2014/0363702 A1 * | 12/2014 | Kim | H01M 2/24 429/7 |

* cited by examiner

OTHER PUBLICATIONS

International Preliminary Report on Patentability and Written Opinion for PCT/US2014/067700 dated Aug. 2, 2016.

*Primary Examiner* — Ladan Mohaddes
(74) *Attorney, Agent, or Firm* — Buchanan Ingersoll & Rooney PC

(57) ABSTRACT

Systems and methods are disclosed for enhancing the construction and application of batteries by providing a battery system comprising at least one electrochemical panel with at least one electrochemical cell disposed therein, which is configured to enable multi-purpose functionality and applicability of the battery system. Embodiments provide for electrodes and/or current collectors of each electrochemical cell that are transversely orientated with respect to each face of an electrochemical panel. Some embodiments provide for a separator pouch disposed about at least one electrode and/or current collector to electrically insulate the electrode and/or current collector from a structure component of the device. Each electrochemical panel is configured to enable electrical communication with another electrochemical panel and/or an ancillary electric circuit. Each electrochemical panel is configured enable utilization thereof as a structural component of an ancillary structure.

15 Claims, 10 Drawing Sheets

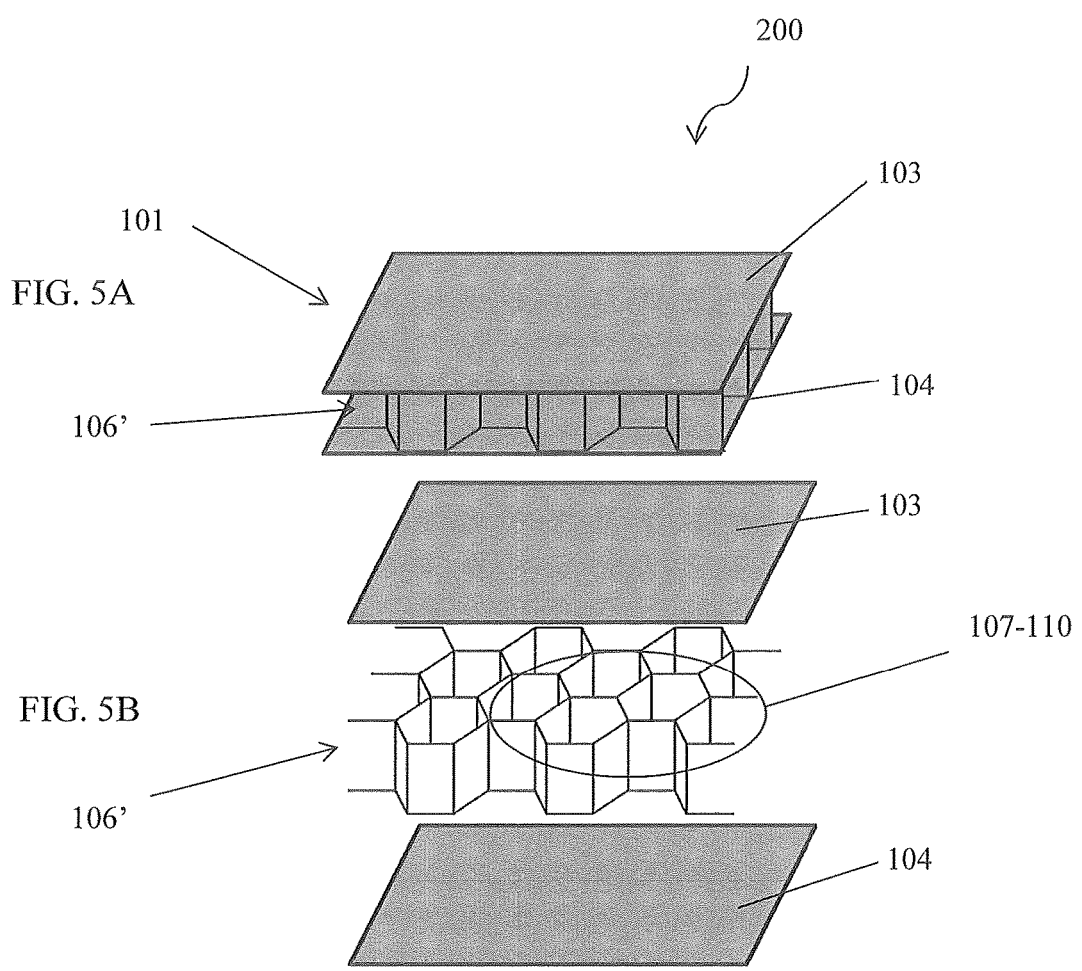

FIG. 8  FIG. 9  FIG. 10
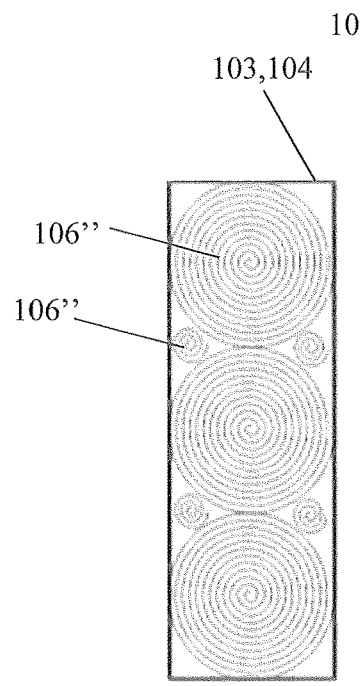
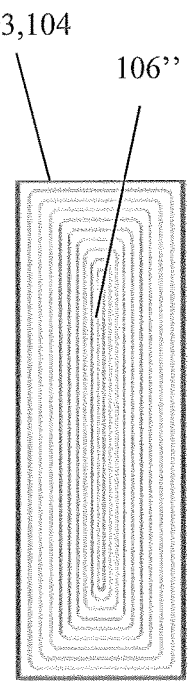
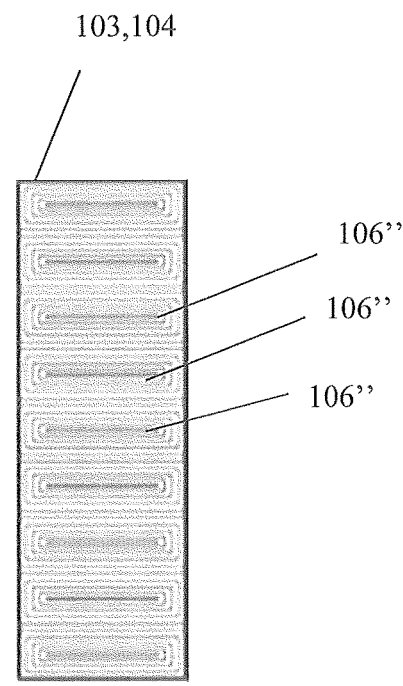
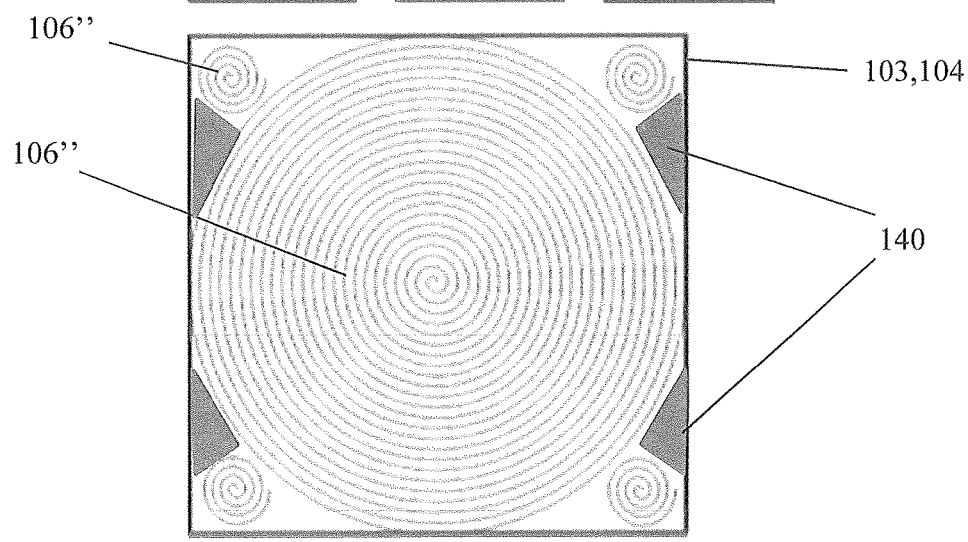
FIG. 11

SANDWICH PANELS WITH BATTERY CORES

CROSS REFERENCE TO RELATED APPLICATIONS

This application claims the benefit of U.S. Provisional Patent Application No. 61/931,877, filed Jan. 27, 2014, and International Patent Application No. PCT/US2014/06770, filed Nov. 26, 2014, and both are incorporated by reference herein.

STATEMENT REGARDING FEDERALLY SPONSORED RESEARCH AND DEVELOPMENT

This invention was made with government support under Grant No. DE-AR0000383, awarded by the Department of Energy. The Government has certain rights in the invention.

BACKGROUND OF THE INVENTION

Field of the Invention

The present disclosure is generally directed towards a battery system enabling multi-purpose functionality and applicability of batteries, and in particular a battery system enabling use of a battery as a structural and/or support element of an ancillary structure.

Background of the Related Art

The structure and configuration of prior art batteries precludes high performance energy storage while exhibiting structural load capabilities. Furthermore, miniaturization of batteries typically compromises performance and other characteristics. Prior art systems and methods provide limited use of batteries, and suffer from distinct disadvantages and problems that the presently disclosed battery system does not have, overcomes, and/or solves. Thus, there is a need for an improved battery system that is able to withstand the forces demanded by an environment associated with structural load bearing applications, yet also provide sufficient energy storage capacity.

BRIEF SUMMARY OF THE INVENTION

The present disclosure is directed towards systems and methods for enhancing the construction and application of batteries by providing a battery system comprising at least one electrochemical panel with at least one electrochemical cell disposed therein. The electrochemical panel and electrochemical cells are configured to enable multi-purpose functionality and applicability of the battery system.

Integration of batteries into structural components of an apparatus has the potential to reduce the weight, battery volume, and structure volume of the apparatus. For example, the weight, battery volume, and structure volume of an electric vehicle may be significantly reduced if batteries for such vehicles are integrated into the floor panels of the electric vehicle so as to not only provide electric power for the vehicle but to also provide structural support for the bottom portion of the vehicle. Some applications of batteries may reduce cost and increase safety. The art has failed to provide a battery system enabling multi-purpose functionality and applicability so as to enable such a battery system to be integrated into structural components of an apparatus.

While exemplary embodiments may describe and illustrate an electrochemical panel being employed within a floor panel of an electric vehicle to supply electrical power and sustain structural loads associated therewith, one skilled in the art will appreciate, with the benefit of the present disclosure, that utilization of disclosed electrochemical panels are not limited to such use. Disclosed electrochemical panels may be used in any structural component of any apparatus, and may be used to provide various multi-purpose functions. Examples of structural components include, but are not limited to, a door panel, a chassis, a hood, etc. Examples of apparatuses include, but are not limited to, an airplane, a boat, a robot, equipment, etc. Examples of multi-purpose functions include, but are not limited to, load bearing, noise dampening, vibrational dampening, etc.

Embodiments may comprise at least one electrochemical panel with at least one electrochemical cell. Each electrochemical panel comprises a structure including a first face, a second face, a first sidewall, and a second sidewall that are conjoined, or otherwise attached to each other, to house at least one electrochemical cell. Various embodiments provide for electrochemical cells having electrodes and/or current collectors that are transversely orientated with respect to each face. Each electrochemical panel is configured to enable electrical communication with another electrochemical panel and/or an ancillary electric circuit.

Each electrochemical panel is configured for utilization as a battery unit and as a structural or support element of an ancillary structure, enabling multi-purpose functionality. The ancillary structure may include a vehicle frame, floor panel, chassis, fuselage, hull, etc. In addition to receiving, storing, and supplying electrical energy, other multi-purpose functions may include, but are not limited to, functions of load bearing, stress absorbing, strain resilience, force vector deflection, noise dampening, vibrational motion dampening, etc.

A component of the battery system may be electrically conductive to meet a desired material and/or mechanical property. For example, a first or second face may include or be aluminum. With such embodiments, at least one insulative region is formed to electrically insulate an electrode and/or current collector from a component, such as the faces, of the device. This insulative region may be in a form of a pouch that substantially encases a first electrode and/or current collector so as to prevent electrical shorting with a second electrode and/or current collector, yet still enable electrolyte transfer within the electrochemical cell. Alternatively, an electrically insulating adhesive may be used to provide a non-conducting layer between the electrodes and the electrically conductive materials.

In a preferred embodiment, the device has a rectangular shape, forming two long sides and two short sides. A plurality of alternating electrodes (cathode and anode) and/or current collectors (positive and negative) is stacked within the structure of the electrochemical panel and arranged substantially parallel with the long sides to form the electrochemical cell(s). Each current collector comprises a conductive metal coated with an active electrode material. The faces, sidewalls, and/or electrode/current collector layers are bonded together. Negative and positive terminals are disposed on a short side of the device. An electrically insulative yet ionically conductive region, in a form of a pouch, is created around each cathode electrode/positive current collector to enable operation of the electrochemical cell without electrical shorting.

The faces are configured to carry at least a portion of any in-plane loads and flexural loads induced upon the device for a particular structural/electrical application, while the electrode/current collector layers are configured to carry at least a portion of the transverse shear loads that may arise from bending moment gradients in the electrochemical panels due to that structural/electrical application. Because at least the faces and some of the electrode/current collector layers are bonded together, each electrochemical panel can be configured to carry shear loads like a single solid member rather than a stack of individual un-bonded layers. The pouch design enables the mechanical bonding of each cathode electrode/positive current collector with the faces while electrically insulating them from the faces so as to prevent an electrical short within the device.

In such a configuration, the device operates as an electrochemical battery, providing high electrical performance along with the aforementioned multi-purpose functionality. For example, the device may be incorporating it within a floor panel of an electric vehicle. Employing the device in such a manner may reduce the structural weight of the electric vehicle, which may increase the specific energy. Such application of the device may decrease the volume required to construct the electric vehicle, which may increase energy density. Such application of the device may provide better sound and vibration isolation due to some device embodiments having a desired density and being highly damped for low vibration/noise transmissibility. Such application of the device may increase safety due to some embodiments having lower packing factors and more surface area for heat dissipation to prevent thermal runaway.

While these potential advantages are made possible by technical solutions offered herein, they are not required to be achieved. The presently disclosed battery system can be implemented to achieve technical advantages, whether or not these potential advantages, individually or in combinations, are sought or achieved.

BRIEF DESCRIPTION OF THE DRAWINGS

Exemplary embodiments are best understood from the following detailed description when read in conjunction with the accompanying drawings. Included in the drawings are the following figures:

FIGS. 5A and 5B are perspective views of the device illustrating a honeycomb configured electrochemical cell, in accordance with a first alternative embodiment of the present disclosure;

FIG. 8 is a top view of the wound electrochemical cell configuration of the device illustrating three large electrochemical cells and four smaller electrochemical cells, in accordance with the second alternative embodiment of the present disclosure;

FIG. 9 is a top view of the wound electrochemical cell configuration of the device illustrating a rectangularly configured electrochemical cell, in accordance with the second alternative embodiment of the present disclosure;

FIG. 10 is a top view of the wound electrochemical cell configuration of the device illustrating a plurality of rectangularly configured electrochemical cells, in accordance with the second alternative embodiment of the present disclosure;

FIG. 11 is a top view of the wound electrochemical cell configuration of the device illustrating one large electrochemical cell and four smaller electrochemical cells, in accordance with the second alternative embodiment of the present disclosure; and, FIG. 12 illustrates an exemplary process flow for assembling a preferred embodiment of the device 100, in accordance with a preferred method of the present disclosure.

DETAILED DESCRIPTION OF THE INVENTION

Disclosed are systems and methods for enhancing the construction and application of batteries. A battery system comprises at least one electrochemical panel 101 with at least one electrochemical cell 106 (hereinafter referred to as the "device") 100, which has a configuration enabling multi-purpose functionality and applicability of the battery system.

The present disclosure may reference a constituent part or user in singular, but it is understood that a plurality thereof may be utilized and that any description of singulars is done for the sake of ease of illustration and brevity. It is understood that the same reference may include the singular or plurality of that constituent part or user without deviating from the teachings of disclosed systems and methods.

Figure 1:
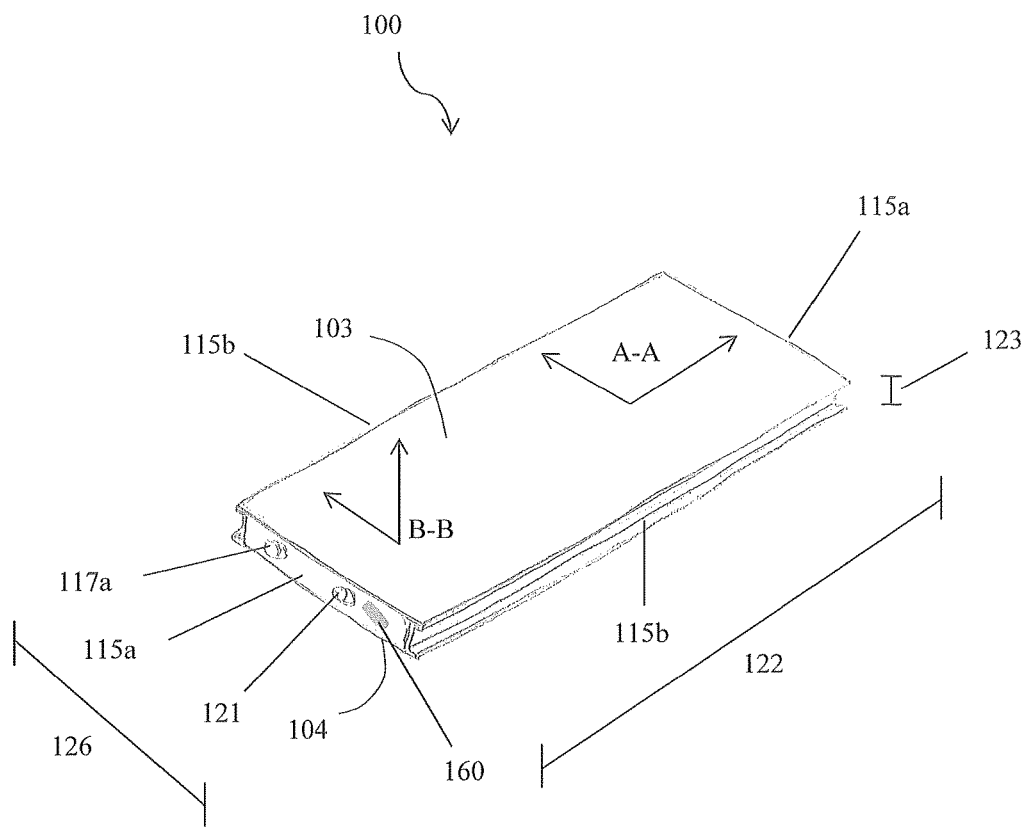
FIG. 1 is a perspective view of an assembled device, in accordance with a preferred embodiment of the present disclosure.
Figures 2A, 2B:
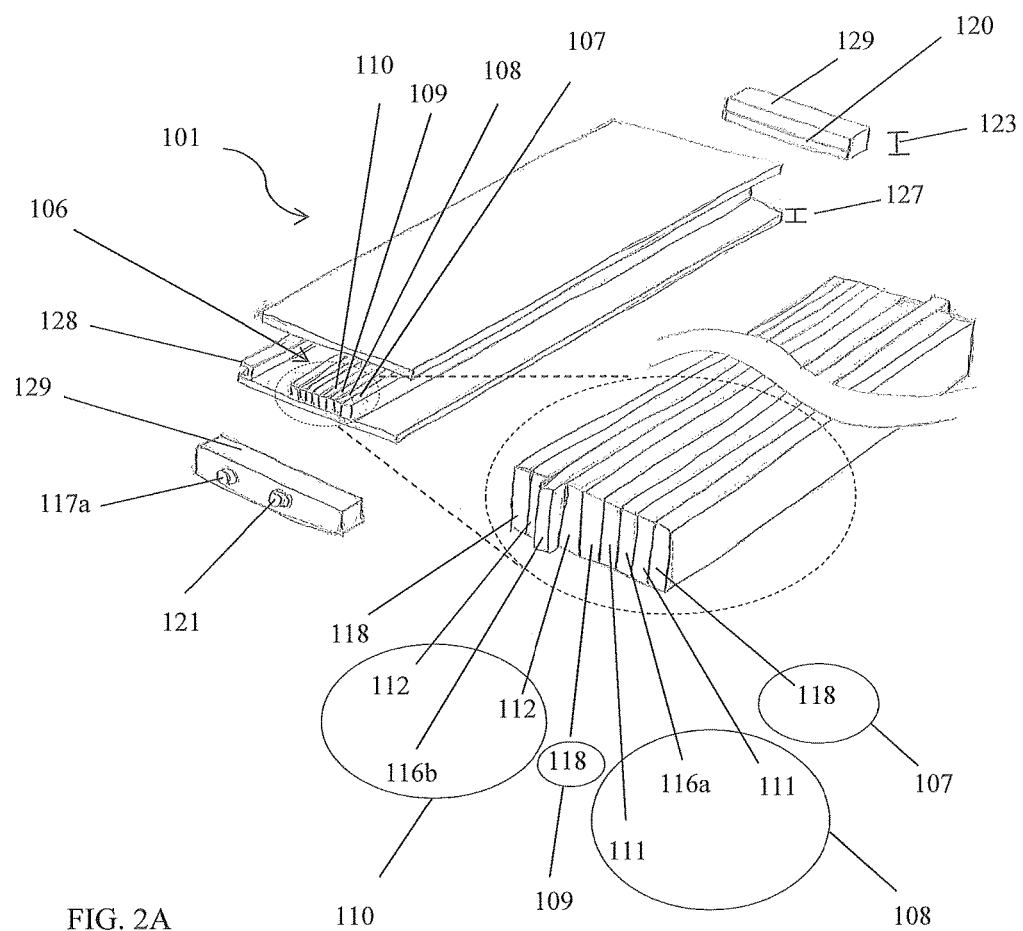
FIG. 2A is a perspective view of the device illustrated as being separated into its component parts, in accordance with the preferred embodiment of the present disclosure.
FIG. 2B is a perspective partial exploded view of a portion of the electrochemical cell illustrated in FIG. 2A, in accordance with the preferred embodiment of the present disclosure.
Figure 3:
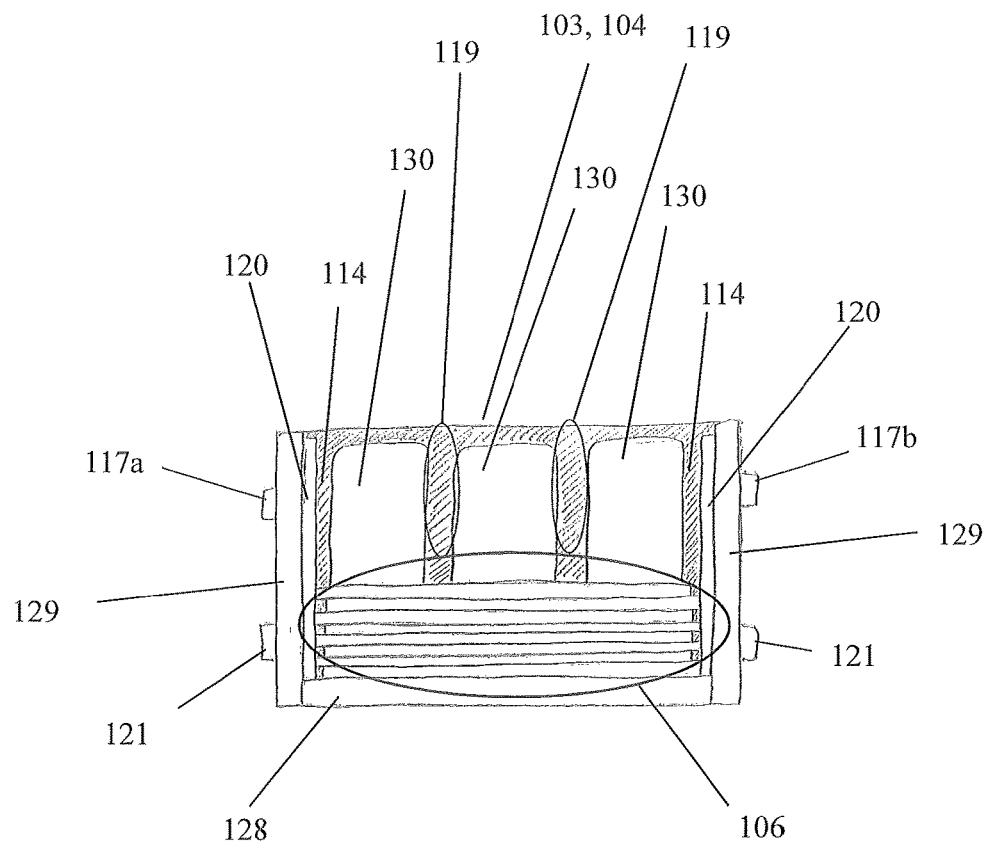
FIG. 3 is a side cross sectional view of the device in the A-A line of FIG. 1, in accordance with the preferred embodiment of the present disclosure.

Referring now to FIGS. 1-3, perspective views of the device 100 and a cross sectional view of the device 100 in the A-A line, in accordance with the preferred embodiment of the present disclosure, are disclosed. The electrochemical panel 101 comprises a structure with a first face 103, a second face 104, and sidewalls 115a, 115b that are conjoined, or otherwise attached to each other, to house, or otherwise enclose, at least one electrochemical cell 106. Depending on a shape of the structure, the sidewalls 115a, 115b may comprise first sidewalls 115a and second sidewalls 115b. The structure is preferably rectangular so that first sidewalls 115a subtend each other, while second sidewalls 115b subtend each other.

The electrochemical cell 106 comprises a first layer 107, a second layer 108 adjacent the first layer 107, a third layer 109 adjacent the second layer 108, and a fourth layer 110 adjacent the third layer 109, wherein at least one layer 107-110 is an electrode 111,112 and at least one layer 107-110 is an insulative region 118. The first and third layers 107, 109 may be configured as insulative regions 118, the second layer 108 may be configured as a cathode electrode 111, and the fourth layer 110 may be configured an anode electrode 112. The layers 107-110 are configured to repeat in the pattern just described so as to generate a set of four layers (107, 108, 109, and 110) that repeat with additional sets of four layers 107-110. One skilled in the art will appreciate, with the benefit of the present disclosure, that more layers 107-110 may be included within a set and that other stacking patterns may be utilized.

The components 103, 104, 115a, 115b of the structure preferably engage each other to fluidly seal each electrochemical cell 106 within the structure, and prevent fluid communication between each electrochemical cell 106 and an environment outside of the structure such that electrolyte 114 of each electrochemical cell 106 is contained. Preferably, at least one electrolyte channel 119 is disposed, or otherwise formed into, an interior of the structure to facilitate directional flow of electrolyte 114 and/or form galleries/head space/cooling channels for the electrolyte 114 to reside. The electrolyte channels 119 are preferably disposed on the faces 103, 014. At least one electrolyte port 121 is disposed on a structure, and configured to be in fluid communication with an electrolyte channel 119 to enable replacement and/or replenishment of electrolyte 114. The electrolyte ports 121 are preferably disposed on a sidewall 115a, 115b. Each electrolyte port 121 may be sealed with a cap/plug/threaded fastener (not shown).

The device 100 is configured such that the first face 103 is substantially parallel to the second face 104, and the electrochemical cell 106 layers 107-110 are transversely orientated with respect to the first face 103 and second face 104 such as to be substantially perpendicular to each face 103, 104. However, one skilled in the art will appreciate, with the benefit of the present disclosure, that other configurations may be utilized. For example, at least one layer 107-110 may form an obtuse and/or acute angle with a face 103, 104. As another alternative, a first face 103 may not be substantially parallel to a second face 104.

At least one positive current collector 116a may be placed into electrical communication with at least one cathode electrode 111. At least one negative current collector 116b may be placed into electrical communication with at least one anode electrode 112. Each current collector 116a, 116b may be part of an electrochemical cell 106 and/or part of an electrochemical panel 101 structure. Each current collector 116a, 116b may be configured within the electrochemical cell 106 and/or electrochemical panel 101 structure in similar fashion as the electrochemical cell layers 107-110. Each cathode electrode 111 may be conjoined with a positive current collector 116a, and each anode electrode 112 may be conjoined with a negative current collector 116b. Preferably, a positive current collector 116a comprises a conductive metal strip, and is coated with a cathode coating 111, thereby becoming part of the second layer 108, as shown in FIG. 2B. Preferably, a negative current collector 116b comprises a conductive metal strip, and is coated with an anode coating 112, thereby becoming part of the fourth layer 110, as shown in FIG. 2B.

Preferably, at least one terminal tab 120 is disposed within a structure. The terminal tabs 120 are preferably disposed on a sidewall 115a, 115b. Each tab 120 is preferably configured as a bus tab, as shown in FIG. 2A. A bus tab may enable parallel connection of a plurality of electrochemical cells 106. It is envisioned that the terminals 117a, 117b extend through the end channels 129 to facilitate connection with the tabs 120. FIG. 2B illustrates a set of layers 107-110 with the positive and negative current collectors 116a, 116b extending beyond an edge of the other layers to facilitate electrical communication with the tabs 120 when the device 100 is assembled; however, one skilled in the art will appreciate, with the benefit of the present disclosure, that other configurations may be utilized to facilitate such electrical communication. For example, the current collectors 116a, 116b may be welded to conductive intermediate tabs that then connect to the bus tabs 120.

Preferably, at least one negative terminal 117a and at least one positive terminal 117b are disposed on a structure. The terminals 117a, 117b are preferably disposed on a sidewall 115a, 115b. Each tab 120 is configured to facilitate electrical communication between each electrode 111, 112/current collector 116a, 116b and a terminal 117a, 117b. Each terminal 117a, 117b is configured to place at least one electrochemical cell 106 in electrical communication with another electrochemical panel 101 and/or an ancillary electrical circuit (not shown), such as a an electric vehicle's electrical system for example.

In systems with multiple electrochemical cells 106 within an electrochemical panel 101, a plurality of electrochemical cells 106 may be arranged in electrical series, electrical parallel, and/or any combination/permutation thereof. In such multiple electrochemical cell 106 systems, a plurality of electrochemical cells 106 may be arranged to form a stack, or even a battery of stacks. A first electrode 111, 112 from a first electrochemical cell 106 may be placed into electrical communication with a second electrode 111,112 from a second electrochemical cell 106. Similarly, multiple electrochemical panels 101 may be arranged in electrical series, parallel, and/or any combination/permutation thereof.

In multiple electrochemical cell systems, each electrochemical cell 106 may be separated by bipolar plates (not shown) to serve as a cathode electrode 111 for a first electrochemical cell 106 and an anode electrode 112 for an adjacent electrochemical cell 106. Monopolar plates (not shown) may be disposed at terminal ends of a stack of electrochemical cells 106. Each monopolar plate and/or bipolar plate may be part of an electrochemical cell 106 and/or part of a structure of an electrochemical panel 101. Each monopolar plate and/or bipolar plate may be configured within the electrochemical cell 106 and/or structure of an electrochemical panel 101 in similar fashion as the electrochemical cell layers 107-110 described above.

Figure 4A:
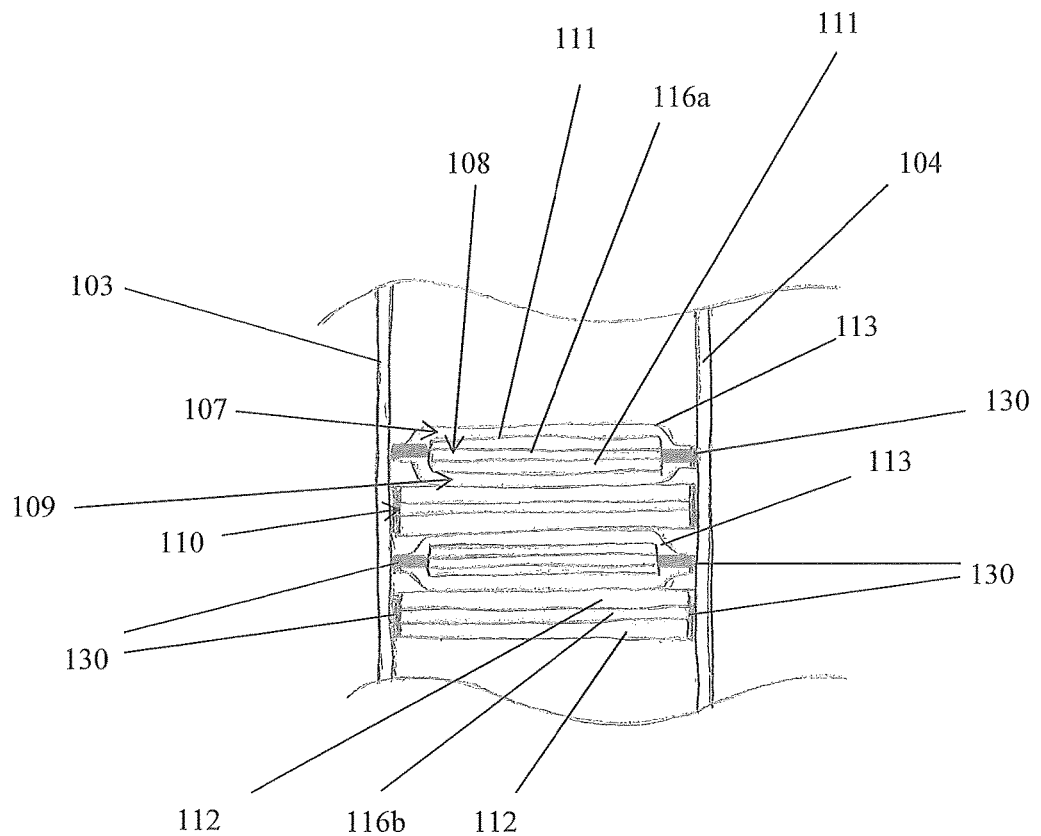
FIGS. 4A and 4B are exploded partial side cross sectional views of the device in the B-B line of FIG. 1, in accordance with the preferred embodiment of the present disclosure.
Figure 4B:
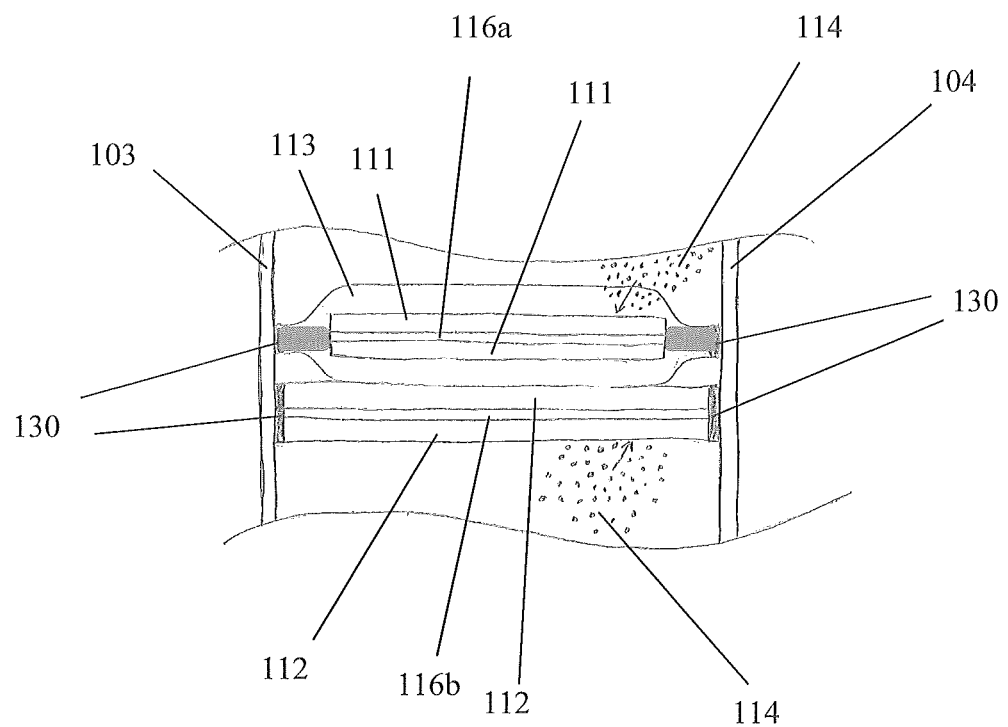
Figure 6:
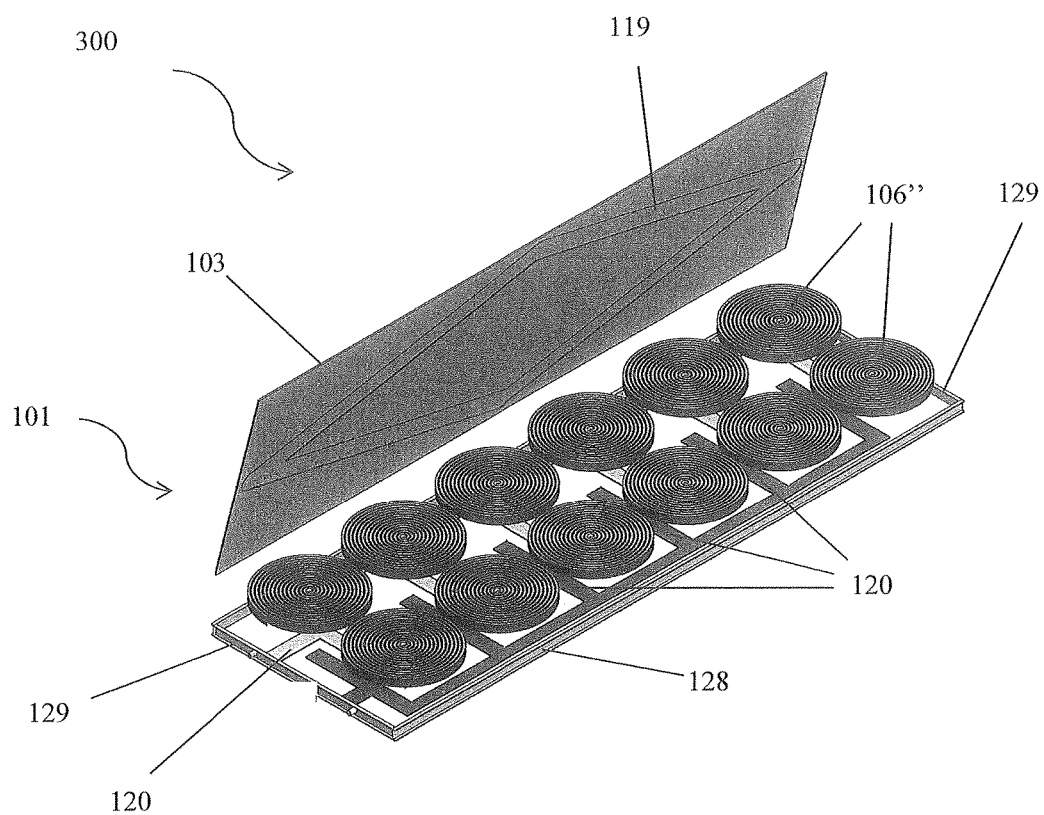
FIG. 6 is a perspective view of the device having a wound electrochemical cell configuration, in accordance with the second alternative embodiment of the present disclosure.
Figure 7:
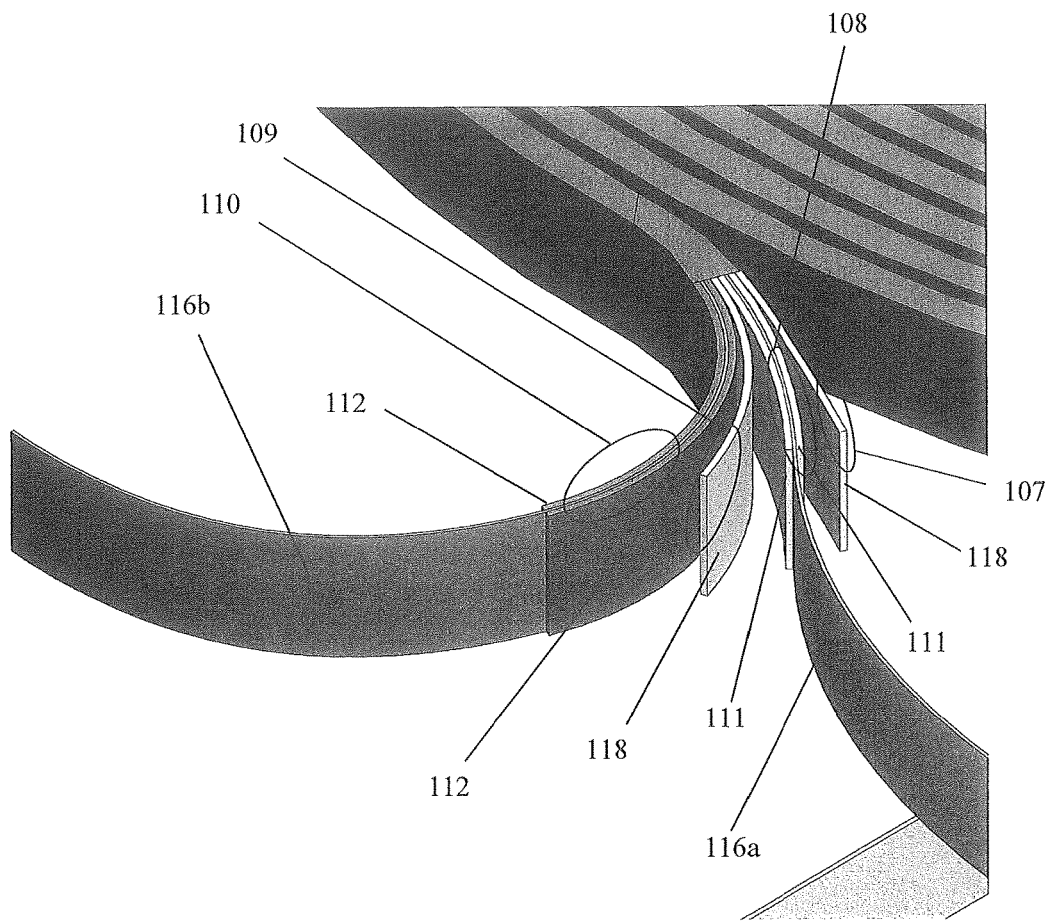
FIG. 7 is a perspective exploded partial view of a strip of wound layers illustrating the preferred composition of the strip, in accordance with the second alternative embodiment of the present disclosure.

Referring now to FIGS. 4A and 4B, exploded partial side cross sectional views of the device 100 in the B-B line of FIG. 1, in accordance with the preferred embodiment of the present disclosure, are disclosed. Any component of the structure of the electrochemical panel 101 may be electrically conductive. For example, a face 103, 104 may comprise aluminum to meet a desired material and/or mechanical property for a desired application of the device 100. With such embodiments, at least one insulative region 118 may be formed to electrically insulate an electrode 111, 112/current collector 116a, 116b from a structure component of the electrochemical panel 101. An insulative region 118 may be configured to both mechanically bond and electrically insulate an electrode 111, 112/current collector 116a, 116b to/from a structure of an electrochemical panel 101. An insulative region 118 is preferably formed by encasing, or substantially encasing, an electrode 111, 112/current collector 116a, 116b with separator material, thereby forming a separator pouch 113. This separator pouch 113 enables mechanically bonding an electrode 111, 112/current collector 116a, 116b to at least one structural component of an electrochemical panel 101 but electrically insulating it therefrom.

Preferably, a separator pouch 113 is formed around each cathode electrode 111/positive current collector 116a, but not around each anode electrode 112/negative current collector 116b. With the electrodes 111, 112/current collectors 116a, 116b stacked in an alternating fashion (anode, cathode, anode, cathode, . . . ), the insulative regions 118 created by the separator pouch 113 encasing each cathode electrode 111/positive current collector 116a becomes part of the first and third layers 107, 109. Each insulative region 118 is configured to be porous to enable through-flow of electrolyte 114 to/from an encased cathode electrode 111/positive current collector 116a, but electrically insulating to prevent, or at least impede, electric conductance so as to obviate electric current from traveling along an unintended path of the device 100. An example of an unintended path may be creating an electrical short. For example, an insulative region 118 may be configured to avoid a cathode electrode 111 shorting with an anode electrode 112. One skilled in the art will appreciate, with the benefit of the present disclosure, that other configurations may be used to prevent causing a repugnancy of electrical energy transfer (e.g., electrical impedance, electrical capacitance, etc.) of the device 100 and/or an ancillary electrical system used in conjunction with the device 10.

Referring back to FIGS. 1-3, a preferred embodiment of the device 100 will now be described. In a preferred embodiment, an electrochemical panel 101 comprises a structure with at least one electrochemical cell 106 contained with the structure. The first face 103 is substantially parallel to the second face 104, where each face 103, 104 comprises a planar plate that is approximately rectangular so that when assembled, the device 100 has an overall rectangular shape. Both first sidewalls 115a form short sides of the rectangular shape and both second sidewalls 115b form long sides of the rectangular shape. A plurality of alternating electrodes 111, 112/current collectors 116a, 116b is stacked within the structure of the electrochemical panel 101. Each electrode 111, 112/current collector 116a, 116b is configured as a flat member, and each are arranged to be substantially parallel with the second sidewalls 115b. Negative and positive terminals 117a, 117b are disposed on at least one of the first sidewalls 115a. As depicted in FIGS. 4A and 4B, an insulative region 118 is formed around each cathode electrode 111a/positive current collector 116a via a separator pouch 113 to enable operation of an electrochemical cell 106 of the electrochemical panel 101 without electrical shorting. At least the faces 103, 104 are bonded via adhesive 130 to the electrodes 111, 112/current collectors 116a, 116b, again as shown in FIGS. 4A and 4B.

In such a configuration, the device 100 operates as an electrochemical battery while providing the aforementioned multi-purpose functionality. If a plurality of electrochemical panels 101 were employed as a structural component of an ancillary apparatus, the faces 103, 104 may be configured to carry most of the in-plane loads and flexural loads, while the layers 107-110 may be configured to carry most of the transverse shear load arising from bending moment gradients in the electrochemical panels 101. Because at least the faces 103, 104 and layers 107-110 are bonded together, each electrochemical panel 101 can be configured to carry shear loads like a single solid member rather than a stack of individual un-bonded layers 107-110.

Possible Dimensions and Possible Material Characteristics

Referring back to FIGS. 1-3, preferred embodiments are provided as to enable a possible use of the device 100 as a structural component of an electric vehicle. It is understood that the embodiments illustrating specific materials, dimensions, and configurations thereof are preferred embodiments, and are not to be viewed as limiting. In addition to receiving, storing, and supplying electrical energy, other multi-purpose functions may include, but are not limited to, functions of load bearing, stress absorbing, strain resilience, force vector deflection, noise dampening, vibrational motion dampening, etc. For example, a plurality of electrochemical panels 101 may be incorporated into, or form a part of, a vehicle floor panel such that the electrochemical panels 101 provide environmental protection for occupants within the vehicle while the device 100 supplies electrical energy to the vehicle's operating system. With such a use, the structure of each electrochemical panel 101 may be exploited to provide the aforementioned multi-purpose functions.

The electrochemical panels 101 and electrochemical cells 106 preferably exhibit material, mechanical, and electrochemical properties for the desired multi-purpose application. This may include, but is not limited to, flexural rigidity, strength, light weight, battery capacity, etc. Flexural and shear deformation should be within acceptable parameters for the multi-purpose application, and buckling should be precluded. Materials used and configurations of the faces 103, 104 should exhibit enough strength to carry any in-plane loads for a particular application. The compilation of layers 107-110 should be configured to be strong enough to carry transverse shear loads, and of sufficient thickness and stiffness to prevent overall buckling and crimping of the electrochemical panel 101 for a particular application. The compilation of layers 107-110 should be configured to exhibit sufficient compressive stiffness and strength to resist crushing and wrinkling of the faces 103, 104 by out-of-plane concentrated loads for a particular application. Each electrochemical cell 106 should be small enough to prevent intra-cell dimpling of any compression experienced by the faces 103, 104 for a particular application. The faces 103, 104 are preferably bonded to the layers 107-110; therefore, the bond should exhibit strong adhesion within a corrosive electrolyte environment. Preferably, the current collectors 116a, 116b provide the majority of stiffness and strength during traverse shear loads, so strong adhesion helps to transmit shear from the faces 103, 104 the layers 107-110.

Preferably, each electrochemical panel 101 is substantially rectangular, where each face 103, 104 is approximately 313 mm in length 122, 100 mm in width 126, and 1 mm in thickness 127. Each sidewall 115a, 115b is approximately 15 mm, and the total including 103, 104 thickness and adhesive 130 (see FIG. 4A) layer thickness is 17.86 mm in height 123. The device 100 is configured to sustain loads of at least 750 N, with a 265 N/mm load per unit displacement at mid-span, without damage and/or leakage. The device 100 exhibits a discharge capacity of at least 18.9 Ah at C/3 rate and room temperature, an energy density of at least 248 Wh/L, and a specific energy of at least 113 Wh/kg. In an electric vehicle application, the electrochemical panel 101 can be as large as the entire floor of the vehicle and 7 cm thick with a commensurate energy capacity (e.g. 85 kWh) and structural strength. Other dimension, load capacity, discharge capacity, specific energy, and capacity retention parameters may be utilized for a particular application.

It is understood that the above-referenced parameters are dependent upon the application for the device 100, thus will be codependent on other variables such as spatial and energy storage capacity. For example, vehicle panels vary in thickness from roughly 8 mm to 80 mm, with a typical thickness of 15 mm. Therefore, a device 100 may have dimension of 282 mm long and 102 mm wide to meet desired, load capacity, discharge capacity, specific energy, and capacity retention parameters. Such a device 100 may comprise a plurality of electrochemical panels 101 in electro-mechanical connection with each other. Alternatively, the device 100 may be configured such that a single electrochemical panel 101 covers, or makes up, the entire floor or floor panel of a vehicle.

Mechanical/structural functionality of the device 100 for an application within a chassis of a vehicle may include, but is not limited to, impact safety, torsional rigidity, road debris protection, strong connection with the body, sub-frame elements (e.g. suspension), and other attached components, etc. Torsional rigidity is desired to maintain the performance and feel of a modern vehicle. Substituting the device 100 for the existing chassis structure should not reduce the frame rigidity. Torsional rigidity is a parametric variable used in the design of a device 100; therefore, the device 100 is preferably provided with the same area moment of inertia as two rocker panels running between the front and rear axles of a vehicle within which the device 100 will be used. In a preferred embodiment, the area moment of inertia for two rocker panels is calculated to be approximately 2800 cm$^4$. With these variables, the device 100 preferably comprise a plurality of electrochemical panels 101 electro-mechanically connected together.

Preferred materials and configurations for each part of the device 100 to meet the aforementioned parameters are discussed below. While the following describes the preferred materials and configurations, one skilled in the art will appreciate, with the benefit of the present disclosure, that other materials and configurations may be utilized without deviating from the teachings of the device 100.

Possible Embodiments of Electrochemical Cells and Electrolyte

Still referring to FIGS. 1-3, electrochemical cells 106 are preferably Lithium-Ion ("Li-ion") cells 106 with metallic current collectors 116a, 116b. Other electrochemical cells 106 may include, but are not limited to, a Nickel Metal Hydride cell 106, a supercapacitor 106, etc. The preferred an electrolyte 114 for a Li-ion electrochemical cell 106 is 1.0 M or 1.2 M LiPF$_6$ in a mixture of ethylene carbonate, dimethyl carbonate, and/or ethyl-methyl carbonate and/or diethyl carbonate. Other electrolyte 114 may be used. This may include, but is not limited to, vinylene carbonate (VC) or fluoroethylene carbonate (FEC) electrolyte additive.

Possible Embodiments of Electrodes and Current Collectors

Referring back to FIGS. 4A and 4B, each positive current collector 116a/cathode electrode 111 has an 11 mm width, and is encased in a separator pouch 113. Each negative current collector 116b/anode electrode 112 has a 15 mm width, and is not encased in a separator pouch 113. The disparate widths ensure proper registry between each positive current collector 116a/cathode electrode 111 encased in a separator pouch 113 and a negative current collector 116b/anode electrode 112 as they are stacked within the device 100.

The positive current collectors 116a preferably comprise a conductive metal strip coated, partially or completely, with an active material cathode coating 111, thus creating the cathode electrode 111/positive current collector 116a. This conductive metal strip may include or be aluminum. The negative current collectors 116b preferably comprise a conductive metal strip coated, partially or completely, with an active material anode coating 112, thus creating the anode electrode 112/negative current collector 116b. This conductive metal strip may include or be copper. The preferred energy density of a constructed device 100 is >230 Wh/L; however, coating thicknesses and amount of surface area coated may be adjusted to achieve other energy densities. The active material cathode coating 111 comprises $LiNi_{1/3}Co_{1/3}Mn_{1/3}O_2$ ("NCM"). Other cathode coatings 111 may include, but are not limited to, $LiFePO_4$ ("LFP"), $LiMnPO_4$, $LiCoPO_4$, $LiNiPO_4$, and their variants, $LiMn_2O_4$ (LMO), $LiNi_{0.5}Mn_{1.5}O_4$ and their variants, and $LiMO_2$ (lithium transition metal oxides), etc. The NCM coating is approximately 180 μm thick including double-sided coating and 20 μm thick aluminum foil (current collector 116a). The active material anode coating 112 comprises mesocarbon microbeads ("MCMB"). Other anode coatings 112 may include graphite, silicon, tin, lithium titanium oxide, transition metal oxides (e.g., $Fe_3O_4$, $Co_3O_4$, $MnO_2$, $TiO_2$, etc.) and their variants. The MCMB coating is approximately 164 μm thick including double-sided coating and 18 μm thick copper foil (current collector 116b). Cathodes 111 may be used that are shorter than anodes 112 to minimize aging.

Preferably, water based CMC/SBR binder is used for MCMB anode coating 112, and PVDF/NMP binder is used for NCM cathode coating 111. The coating/binder slurries are sufficiently mixed to ensure no agglomerate, and the amount of the solvent (water or NMP) is adjusted to attain a desired viscosity. This desired viscosity may be 3000-5000 cP. The coating/binder slurries are transferred to a coating machine (not shown) and uniformly coated on both sides of the current collectors 116a, 116b. The coating quality is controlled to ±1.5% loading weight and to ±1% thickness.

A roll press (not shown) may also be used to decrease the coating 111, 112 thickness. Pressing may also decrease the porosity, increases the density, and improve the adhesion of the coatings 111, 112 with the current collectors 116a, 116b. After the pass through the roll press, the coating 111, 112 thickness, loading amount, and porosity are measured, and more passes through the roll press may be made, if desired. The coated current collectors 116a, 116b may then be cut to desired lengths and widths.

Possible Embodiments of Separator Pouches

Referring back to FIGS. 4A and 4B. The separator material used to form the separator pouch 113 comprises a Celgard® tri-layer polypropylene/polyethylene/polypropylene ("PP/PE/PP"). Other separator materials may be used. Each Celgard® PP/PE/PP separator pouch 113 is heat-sealed with a cathode electrode 111/positive current collector 116a encased inside. Each Celgard® PP/PE/PP separator pouch 113 is sealed by using an Impulse Sealer, Uline H-963 (not shown). Each Celgard® PP/PE/PP separator pouch 113 is preferably 20 μm thick.

Possible Embodiments of Bonding Between Layers and Faces

Still referring FIGS. 4A and 4B. Each layer 107-110 is bonded to each face 103, 104, wherein the bond between the layers 107-110 and faces 103, 104 exhibits a stress capacity of at least 17 MPa, which includes a safety factor of 2.3. The bonding between the faces 103, 104 and the positive current collectors 116a/cathode electrodes 111 may be compromised due to the separator pouch 113, so a relatively stronger bond of between the faces 103, 104 and the negative current collectors 116b/anode electrodes 112 may be desired. Such a bond is preferably achieved through adhesives 130. The adhesive 130 exhibits no or little electrolyte 114 uptake (i.e., should absorb little or no electrolyte 114 when immerse in electrolyte 114 solution) so as to have little or no effect on the mechanical and/or bonding properties of the adhesive 130. Electrolyte uptake may be measured gravimetrically, and the physical swelling caused by the uptake may be assessed by visual inspection.

Loctite E-120HP paste epoxy with E-glass veil is the preferred adhesive 130 because of the low uptake and high mechanical strength exhibited while immersed in electrolyte 114 solutions. Other adhesives 130 may be utilized. These may include, but are not limited to, Henkel EA9462 epoxy film, Epoxy EA 9696(0.03), Epoxy EA 9696(0.06), RTV Silicon (or siloxane), other polymer based adhesives, high performance adhesives related to aromatic polymers and composites, etc. Loctite E-120HP, being a paste, provides an additional advantage of enabling modification and reformulation, if desired.

In addition to the relatively stronger bond at the interface between the faces 103, 104 and the negative current collector 116b/anode electrode 112, each negative current collector 116b may have a thickness that is greater than that of a negative current collector in a conventional lithium-ion battery. For example, a negative current collector 116b may have a thickness of 18 µm, whereas a negative current collector of a conventional battery may have a thickness of 9 µm. Each positive current collector 116a may have a thickness from 15 µm to 20 µm.

In addition, adhesives 130 having temperature-viscosity characteristics to prevent the adhesive 130 from wicking excessively into the electrochemical cell 160 and provide a strong fillet where the edge of the layers 107-110 contact the faces 103, 104 may be utilized. Room-temperature curing, two-part E-120 HP would allow a high viscosity of the adhesive during curing without heat. High-temperature, single part adhesives, such as E-214HP could be cured at 100° C. or greater for low-viscosity adhesive during curing.

Possible Embodiments of Faces and Sidewalls

Referring back to FIGS. 1-3, each face 103, 104 and sidewall 115a, 115b comprise materials that are stiff and structurally strong. These materials have a Young's modulus greater than 30 GPa, and ultimate strength greater than 90 MPa. Such materials may include, but are not limited to, aluminum, stainless steel, fiber reinforced polymer ("FRP") composite, etc. The preferred embodiment utilizes aluminum faces 103, 104, each face 103, 104 having a thickness 127 of approximately 1 mm, and aluminum sidewalls 115a, 115b approximately 15 mm in height 123. Each second sidewall 115b is configured as a retention channel 128. The retention channels 128 are preferably configured to provide a hermetic seal for an electrochemical panel 101, which is a purpose of the C-shaped configuration. C-shaped sidewalls 115b are also lighter than solid sidewalls 115b and can be adapted to enable mechanical connections with other structural elements. Each first sidewall 115a is configured as an end-channel 129. Note that the second retention channel 128 in FIG. 2A has been removed for illustration purposes.

After the current collector 116a, 116b/electrode 111, 112 are stacked and bonded to the faces 103, 104, the end-channels 129 may be applied to the short sides while electrical connections from the electrochemical cell 106 are routed to an exterior of the device 100. The retention channels 128 may then be applied to the long sides to seal the device 100. Electrolyte 114 solution is then introduced via at least one electrolyte port 121.

With end-channels 129 preferably being aluminum, formation of electrically nonconductive portions of the end-channel 129 is desired to facilitate egress of electrical connections and to enable electrical communication between the electrochemical cell 106 and the terminals 117a, 117b without undue risk of short circuits. A polyimide coating is preferably disposed on each end-channel to cover at least a portion thereof, thus creating the nonconductive portion(s). Other coatings may be utilized. Each end-channel 129 is preferably 6.53 mm thick. The end channel 129 may include, but are not limited to, polyetherimide, high-density polyethylene (HDPE), etc.

Referring back to FIGS. 4A and 4B, to improve the bond between the adhesive 130 and faces 103, 104 at least one of: 1) treating an inner surface of each face 103, 104 with an etching kit; and, 2) modifying the bond thickness using various spacers (not shown) may be performed. Spacers may include, but are not limited to glass-based scrim cloth or wire spacers.

Etching is performed using a West System 860 applied to each face 103, 104. The preferred steps are followed: 1) each face 103, 104 is rinsed with acetone before cleaner is applied; 2) the cleaner is applied; 3) the cleaner is removed with acetone; 4) each face 103, 104 is allowed to dry at room temperature; 5) a conversion coating is applied to each face 103, 104; and, 6) each face 103, 104 is rinsed with acetone and dried again.

Bond thickness of the adhesive 130 may be directly related to the overall strength of the bond. In the case of ductile adhesives 130, greater bonding thicknesses, however, generally causes more defects in the applied adhesive 130. Furthermore, in electrolyte-equilibrated joints, a greater bond thickness may imbibe more electrolyte 114 solvent, which may negatively affect the bond strength. Bond thickness is controlled by inserting a spacer such as glass-based scrim cloth or wire spacers into the applied adhesive 130. For example, the bond line may be reduced with external spring clamps until the two adherends begin to compress the spacer (the glass scrim cloth or the wire spacers) that is put into the bond line.

Possible Embodiments of Tabs and Current Collector Connections Thereto

Referring back to FIGS. 1-3, the terminal tabs 120 comprise aluminum and nickel/copper, and the electrodes 111, 112/current collectors 116a, 116b are connected to the terminal tabs 120 through conductive intermediate tabs (aluminum and nickel). This may be achieved via ultrasonic welding, resistance welding, or a fastener. Depending on a configuration of a device 100, various connection techniques may be used to minimize contact resistance to a milliohm level and minimize headspace to several mm. Headspace, as used herein, refers to the volume occupied by a contact point between each terminal tab 120 and the electrodes 111, 112/current collectors 116a, 116b. Reducing headspace is preferred so as to minimize inactive volume and increase energy density.

Alternative Embodiments

Referring now to FIGS. 5A and 5B, perspective views of the device 200 illustrating a honeycomb configured electrochemical cell 106', in accordance with a first alternative embodiment of the present invention, are disclosed. While exemplary embodiments show the layers 107-110 stacked horizontally, one skilled in the art will appreciate, with the benefit of the present disclosure, that other configurations are also possible. This may include orientating the layers 107-110 vertically, obliquely, horizontally and/or any combination/permutation thereof. In addition to the layers 107-110 being flat or planar, layers 107-110 may have a sinusoidal configuration, curvilinear configuration, herringbone configuration, rolled configuration, etc. FIGS. 5A and 5B illustrate a honeycomb configuration. Similarly, other components of the structure of the electrochemical panel 101 may be configured as flat, planar, sinusoidal, curvilinear, undulating, etc. On skilled in the art will envision that, with the benefit of the present disclosure, various arrangements of walls and trusses could rigidly connect the facings. In addition, filler materials 140 (see FIG. 11) may be added to so that the layers 107-110 are not straight, but rather slope or undulate along a dimension of an electrochemical panel 101. The dimensions of any layer 107-110, structure component of an electrochemical panel 101, and/or filler material 140 may vary within an electrochemical panel 101 as well. These changes in dimension may be constant from a first end to a second end, may be a step-up/down, or may follow some other profile. Any material and/or mechanical characteristic of any component of an electrochemical panel 101 and/or electrochemical cell 106 may vary in a similar manner.

Varying the dimensions, material characteristics, mechanical characteristics, and configurations is not limited to a single electrochemical panel 101. As described above, the device 100 may comprise a plurality of electrochemical panels 101 that are connectable to each other. Each electrochemical panel 101 may be configured to exhibit a sub-characteristic so that the compilation of electrochemical panels 101 exhibits an overall characteristic. For example, an assembled device 100 may comprise a plurality of electrochemical panels 101 forming a "checkerboard" construction so that layers 107-110 of a first electrochemical panel 101 are perpendicular to layers 107-110 of a second electrochemical panel 101. This may be done to achieve desired shear properties in the longitudinal and transverse directions of the vehicle floor panel.

Additionally, any electrochemical panel 101 may comprise a plurality of electrochemical cells 106'. A first electrochemical cell 106' within an electrochemical panel 101 may be configured differently than that of a second electrochemical cell 106' in the same electrochemical panel 101. The size, shape, number of layers 107-108, thicknesses of components, choice of materials, etc. may differ from one electrochemical cell 106' to the other.

Referring now to FIGS. 6-11, perspective view of a device 300 having a wound electrochemical cell 160" configuration, in accordance with the second alternative embodiment of the present disclosure, are disclosed. In a second alternative embodiment, the device 300 comprises layers 107-110 of an electrochemical cell 106" that are arranged in a wound configuration. The first layer 107 is an insulative region 118, the second layer 108 is a positive current collector 116a/cathode electrode 111, the third layer 109 is an insulative region 118; and the fourth layer 110 is a negative current collector 116b/anode electrode 112. Each insulative region 118 may include Celgard® PP/PE/PP. Each layer is preferably 12.7 mm in width and approximately 4,500 mm in length, forming an approximate 45 mm diameter wounded electrochemical cell 106". The layers 107-109 are wound under tension to form wound roll electrochemical cells 106". The wound roll configuration preferably does not include the separator pouch 113.

The current collectors 116a, 116b are connected to tabs 120, and the edges of the wound layers 107-109 are bonded to the faces 103, 104, as described earlier. The end-channels 129, retention channels 128, other components, sealing techniques, choice of materials, etc. described earlier may be used with the alternative device 300. A wound roll configuration may increase the shear stiffness and decreases overall deflections because of the relatively large amount of transversely orientated layers 107-110 associated with this type of configuration. The second alternative embodiment may provide a multiaxial reinforcement due to its configuration.

The wound layers 107-110 may comprise a single strip of the four layers 107-110 or multiple strips. A strip may comprise more than four layers 107-110. Although a 12.7 mm width, a 4,500 mm length, and a 45 mm diameter roll are preferred, other dimensions may be utilized. Additionally, a wound roll electrochemical cell 106" may take on a shape other than circular, such as rectangular or prismatic, etc., as shown in FIGS. 8-11. An electrochemical panel 101 may comprise more than one wound electrochemical cell 106", also shown in FIGS. 8-11. Additional filler material 140 may be included around the electrochemical cells 106" to prevent dimpling of a face 103, 104, and electrolyte intrusion.

A preferred method of constructing strips of wounded electrochemical cell 106" layers 107-110 are as follows. Four sheets of material are feed into a winding machine (not shown). The sheets comprise: 1) the cathode 111/positive current collector 116a; 2) a sheet of Celgard® PP/PE/PP; 3) the anode 112/negative current collector 116b; and, 4) a sheet of Celgard® PP/PE/PP. The Celgard® PP/PE/PP sheets are pulled in between the upper and lower halves of a mandrel of the machine. The cathode 111/positive current collector 116a sheet is on top, followed by a first Celgard® PP/PE/PP sheet, then the anode 112/negative current collector 116b sheet, and then the second Celgard® PP/PE/PP sheet. These four layers 107-110 are wound around the mandrel (4 mm diameter). During the winding process, alignment of the layers 107-110 is effectuated using the winding machine.

At the end of winding, the first and second Celgard® PP/PE/PP sheets make two more encirclements of the wounded layers 107-110 to secure the layers 107-110 and insulate the cathode 111/positive current collector 116a and the anode 112/negative current collector 116b. Kapton® tape (not shown) may be used to secure the wounded layers 107-110 together. While Celgard® PP/PE/PP is used for layers 108 and 109, it is understood that other separator materials may be utilized without deviating from the teachings of the device 300. The wounded layers 107-110 are bonded to the structure of the electrochemical panel 101, as described before. The device 200 is transferred to a glove box for electrolyte 114 filling.

Connectors (not shown) may be provided for any embodiment to facilitate mechanical connections between the device 100, 200, 300 and the sub-frame and body of the vehicle. Such connectors may be built into and/or pass through an electrochemical panel 101. Connectors may include, but are not limited to, welding, bonding, or other fasteners. Bonding may include the use of adhesives. Fasteners may include the use of bolt-fasteners. Bolt-fastener connectors may allow for future disassembly and servicing. Modular sub-panel 101 designs may also provide a desired scalability and adaptability for multiple vehicle platforms. Additional structural channels (not shown) may be used around each electrochemical panel 101 to strengthen the structural integrity of the assembled device 100, 200, 300 and provide connections between each electrochemical panel 101. This may also enable the replacement of individual electrochemical panels 101 rather than the device 100, 200, 300 (i.e. the whole floor of the vehicle) if part of the device 100, 200, 300 degrades, fails, malfunctions, is damaged, or otherwise becomes inoperable.

Possible Method of Assembly

Figure 12:
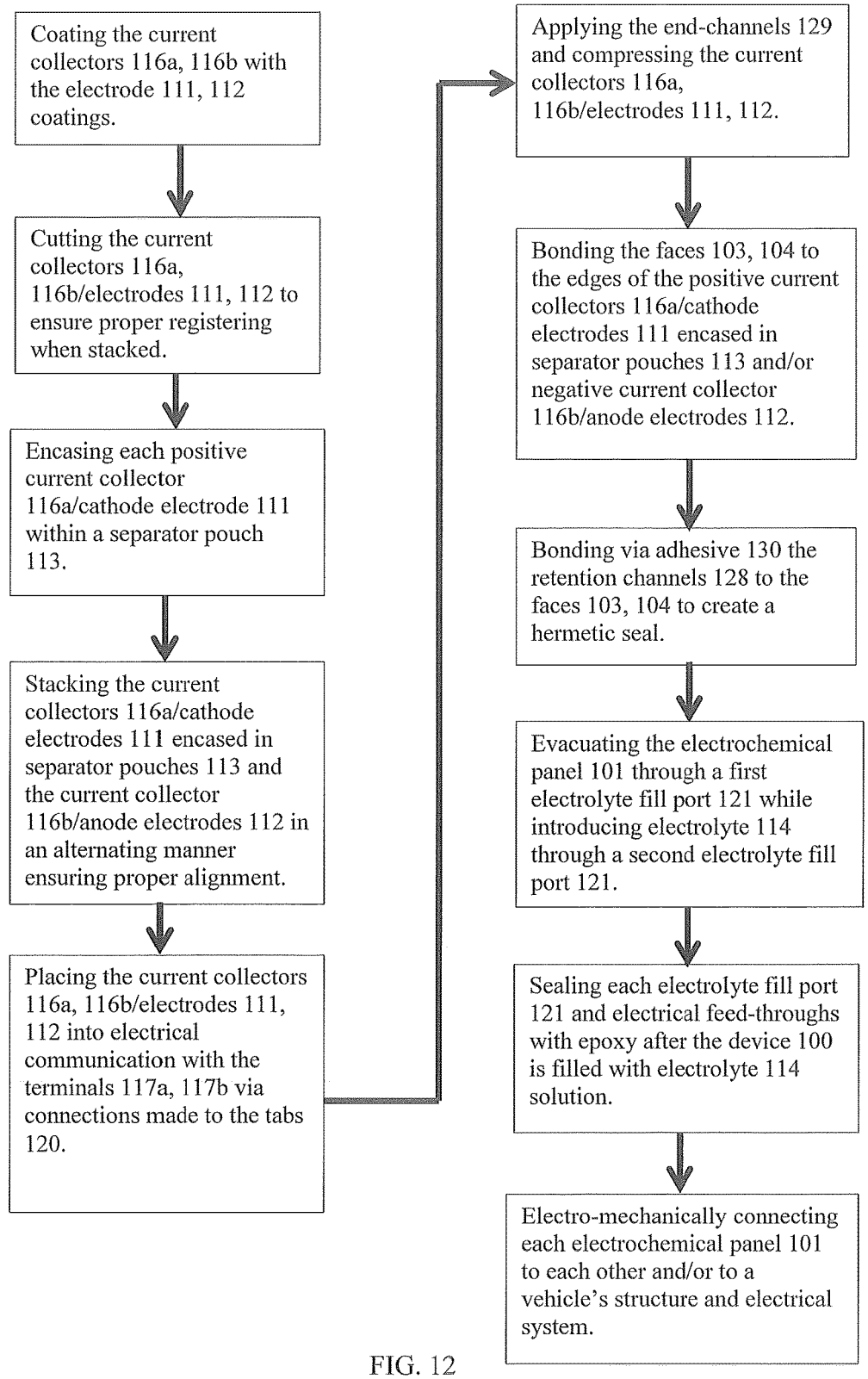

Referring now to FIG. 12, an exemplary process flow for assembling a preferred embodiment of the device 100, in accordance with a preferred method of the present disclosure, is disclosed. A method of assembling the preferred embodiment of the device 100 comprises the following steps: 1) coating the current collectors 116a, 116b with the electrode 111, 112 coatings; 2) cutting the current collectors 116a, 116b/electrodes 111, 112 to ensure proper registering when stacked; 3) encasing each positive current collector 116a/cathode electrode 111 within a separator pouch 113; 4) stacking the current collectors 116a/cathode electrodes 111 encased in separator pouches 113 and the current collector 116b/anode electrodes 112 in an alternating manner ensuring proper alignment; 5) placing the current collectors 116a, 116b/electrodes 111, 112 into electrical communication with the terminals 117a, 117b via connections made to the tabs 120; 6) applying the end-channels 129 and compressing the current collectors 116a, 116b/electrodes 111, 112; 7) bonding the faces 103, 104 to the edges of the positive current collectors 116a/cathode electrodes 111 encased in separator pouches 113 and negative current collector 116b/anode electrodes 112; 8) bonding via adhesive 130 the retention channels 128 to the faces 103, 104 to create the hermetic seal; 9) evacuating the electrochemical panel 101 through a first electrolyte fill port 121 while introducing electrolyte 114 through a second electrolyte fill port 121; 10) sealing each electrolyte fill port 121 and electrical feed-throughs with epoxy after the device 100 is filled with electrolyte 114 solution; and, 11) electro-mechanically connecting each electrochemical panel 101 to each other and/or to a vehicle's structure and electrical system.

It may be desirous to clean, dry, and/or coat the retention channels 128 and/or electrodes 111, 112/current collectors 116a, 116b before assembly to prevent undesired dust, moisture, and oxidation during the time required to stack and electrically connect the electrodes 111, 112/current collectors 116a, 116b, and to ensure electrical isolation from the remainder of the structure.

Laser welding may be utilized between edge fillings and the faces 103, 104 to provide a strong leak-proof deal for the electrochemical panel 101.

Volume expansion of the layers 107-110 during the battery formation process may produce high pressure inside the device 100. A pressure release valve 160 temporarily using an electrolyte fill port 121 (see FIG. 1) may be utilized during the formation process to release any pressure inside, which may be sealed after formation.

While various exemplary embodiments of the device 100, 200, 300 have been described above, it should be understood that they have been presented for purposes of example only, and are not to be viewed as limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A device, comprising:
   at least one electrochemical cell, comprising:
      a first layer, a second layer adjacent the first layer, a third layer adjacent the second layer, and a fourth layer adjacent the third layer;
   wherein:
      the first layer is configured as a first insulative region made from a separator material;
      the second layer is configured as a positive current collector coated with a cathode coating;
      the third layer is configured as a second insulative region made from a separator material;
      the fourth layer is configured as a negative current collector coated with an anode coating;
      the separator material of the first and third insulative regions encases the positive current collector but not the negative current collector; and
      the electrochemical cell is configured to receive and retain electrolyte;
   at least one electrochemical panel, comprising a structure having a first face, a second face, a first sidewall, and a second sidewall that are attached to each other to enclose the at least one electrochemical cell, wherein the structure is configured to fluidly seal each electrochemical cell within the structure; and
   wherein:
      at least one of the second layer and the fourth layer is affixed to at least one of the first face and second face;
      the structure is configured such that at least one of the second layer and fourth layer is transversely orientated with respect to at least one of the first face and the second face;
      the separator material is configured to electrically insulate the positive current collector from each electrochemical panel; and
   the first and second faces are configured to carry at least a portion of any in-plane loads and flexural loads induced upon the device, while at least one of the positive and the negative current collector is configured to carry at least a portion of transverse shear loads arising from bending moment gradients in the at least one electrochemical panel.

2. The device recited in claim 1, further comprising at least one electrolyte fill port disposed on the structure and in fluid communication with at least one of the first layer and the third layer.

3. The device recited in claim 1, wherein the first face is parallel to the second face.

4. The device recited in claim 1, wherein at least one of the first layer and third layer is configured as a flat member and perpendicularly oriented with respect to at least one of the first face and second face.

5. The device recited in claim 1, wherein the separator material is tri-layer polypropylene/polyethylene/polypropylene.

6. A device, comprising:
   at least one electrochemical cell, comprising:
      a first layer, a second layer adjacent the first layer, a third layer adjacent the second layer, and a fourth layer adjacent the third layer;
   wherein:
      the first layer is configured as a first insulative region made from a separator material; region,
      the second layer is configured as a positive current collector coated with a cathode coating;
      the third layer is configured as a second insulative region made from a separator material;
      the fourth layer is configured as a negative current collector coated with an anode coating;
      the first layer and the third layer form a separator pouch that encases the second layer but not the fourth layer; and the electrochemical cell is configured to receive and retain electrolyte;

at least one electrochemical panel, comprising a structure having a first face, a second face, and a first sidewall, and a second sidewall that are attached to each other to enclose the at least one electrochemical cell, wherein the structure is configured to fluidly seal each electrochemical cell within the structure; and wherein:
  at least one of the second layer and the fourth layer is affixed to at least one of the first face and second face;
  the structure is configured such that at least one of the second layer and fourth layer is transversely orientated with respect to at least one of the first face and the second face;
  the second layer and/or the fourth layer is affixed to at least one of the first face and second face via a bond connecting through the separator pouch, the separator pouch and the bond being configured to electrically insulate the second layer from the first face and the second face; and
  the first and second faces are configured to carry at least a portion of any in-plane loads and flexural loads induced upon the device, while at least one of the positive and the negative current collector is configured to carry at least a portion of transverse shear loads arising from bending moment gradients in the at least one electrochemical panel.

7. The device of claim 6, wherein:
the separator pouch is configured to be porous to enable through-flow of electrolyte to and/or from the encased layer, but electrically insulating so as to at least impede electric conductance.

8. The device recited in claim 7, further comprising at least one electrolyte fill port disposed on the structure and in fluid communication with at least one of the first layer and the third layer.

9. The device recited in claim 7, wherein the first face is parallel to the second face.

10. The device recited in claim 7, wherein at least one of the first layer and third layer is configured as a flat member and perpendicularly orientated with respect to at least one of the first face and second face.

11. The device recited in claim 7, wherein the separator pouch comprises tri-layer polypropylene/polyethylene/polypropylene.

12. A device, comprising:
at least one electrochemical cell, comprising:
  a first layer, a second layer adjacent the first layer, a third layer adjacent the second layer, and a fourth layer adjacent the third layer;

wherein:
  wherein the first layer is configured as a first insulative region made from a separator material;
  the second layer is configured as a positive current collector coated with a cathode coating;
  the third layer is configured as a second insulative region made from a separator material;
  the fourth layer is configured as a negative current collector coated with an anode coating;
  the separator material of the first and third insulative regions encases the positive current collector but not the negative current collector; and
  the electrochemical cell is configured to receive and retain electrolyte;

at least one electrochemical panel, comprising a structure having a first face, a second face, and a first sidewall, and a second sidewall that are attached to each other to enclose the at least one electrochemical cell, wherein the structure is configured to fluidly seal each electrochemical cell within the structure;

at least one electrolyte channel disposed within the structure to at least perform one of facilitate directional flow of the electrolyte and form galleries for the electrolyte to reside; and, wherein:
  at least one of the second layer and the fourth layer is affixed to at least one of the first face and second face;
  the structure is configured such that at least one of the second layer and fourth layer is transversely orientated with respect to at least one of the first face and the second face;
  at least one electrochemical cell comprises a wound strip of the first, second, third, and fourth layers;
  the separator material is configured to electrically insulate the positive current collector from each electromechanical panel;
  the first and second faces are configured to carry at least a portion of any in-plane loads and flexural loads induced upon the device, while at least one of the positive and the negative current collector is configured to carry at least a portion of transverse shear loads arising from bending moment gradients in the at least one electrochemical panel.

13. The device recited in claim 12, further comprising at least one electrolyte fill port disposed on the structure and in fluid communication with at least one electrolyte channel.

14. The device recited in claim 12, wherein the first face is substantially parallel to the second face.

15. The device recited in claim 12, wherein the separator material is tri-layer polypropylene/polyethylene/polypropylene.

* * * * *